(12) United States Patent
Debroche (10) Patent No.: US 6,167,934 B1
(45) Date of Patent: Jan. 2, 2001

(54) REMOVABLE THREAD GUIDE WHICH RECEIVES THREADS PROJECTED ONTO A SURFACE

(75) Inventor: Claude Debroche, Cebazat (FR)

(73) Assignee: Sedepro, Paris (FR)

( * ) Notice: Under 35 U.S.C. 154(b), the term of this patent shall be extended for 0 days.

(21) Appl. No.: 09/318,894

(22) Filed: May 26, 1999

Related U.S. Application Data (63) Continuation-in-part of application No. 08/978,065, filed on Nov. 25, 1997, now Pat. No. 5,971,050.
(60) Provisional application No. 60/032,900, filed on Dec. 16, 1996.

(30) Foreign Application Priority Data

Nov. 27, 1996 (FR) .................................................. 96 14634

(51) Int. Cl.$^7$ .................................................. B29D 30/08
(52) U.S. Cl. ........................... 156/397; 156/117; 156/177
(58) Field of Search ..................................... 156/397, 117, 156/177, 123, 121, 130, 178, 181, 441

(56) References Cited

U.S. PATENT DOCUMENTS

| 3,894,906 | 7/1975 | Pearce et al. . |
| 4,952,259 | 8/1990 | Debroche et al. . |
| 4,992,123 | 2/1991 | Cave et al. . |

Primary Examiner—Geoffrey L. Knable
(74) Attorney, Agent, or Firm—Baker Botts L.L.P.

(57) ABSTRACT

A thread guide for an apparatus for the manufacture of a reinforcement from a thread deposited directly in its final position by projecting lengths of the thread for laying the thread onto a receiving surface in which a pair of deflectors is provided for guiding and controlling the braking pressure exerted on the threads before discharge from a projection orifice and in which at least one deflector is adjusted relative to the other by pivotally adjusting the deflector and locking it in place.

9 Claims, 6 Drawing Sheets

REMOVABLE THREAD GUIDE WHICH RECEIVES THREADS PROJECTED ONTO A SURFACE

This convention application is also entitled to the priority of U.S. provisional application, Ser. No. 60/032,900, filed Dec. 16, 1996, and it is a continuation-in-part of Ser. No. 08/978,065, filed Nov. 25, 1997, now U.S. Pat. No. 5,971,050.

BACKGROUND OF THE INVENTION

The present invention relates, in particular, to the manufacture of tires, and more particularly, to the manufacture of reinforcement armatures, such as those which are present below the tread of belted tires, the carcass of which is generally radial.

Such reinforcements have been manufactured in the form of semi-finished products known as "plies" which were prepared flat and then incorporated in the assembling of the article. U.S. Pat. No. 4,952,259 relates to the producing of such reinforcements from a continuous thread and placing them directly on the tire blank. This proposal is based on the projecting of a thread in the manner of the thong of a whip.

Figure 1:
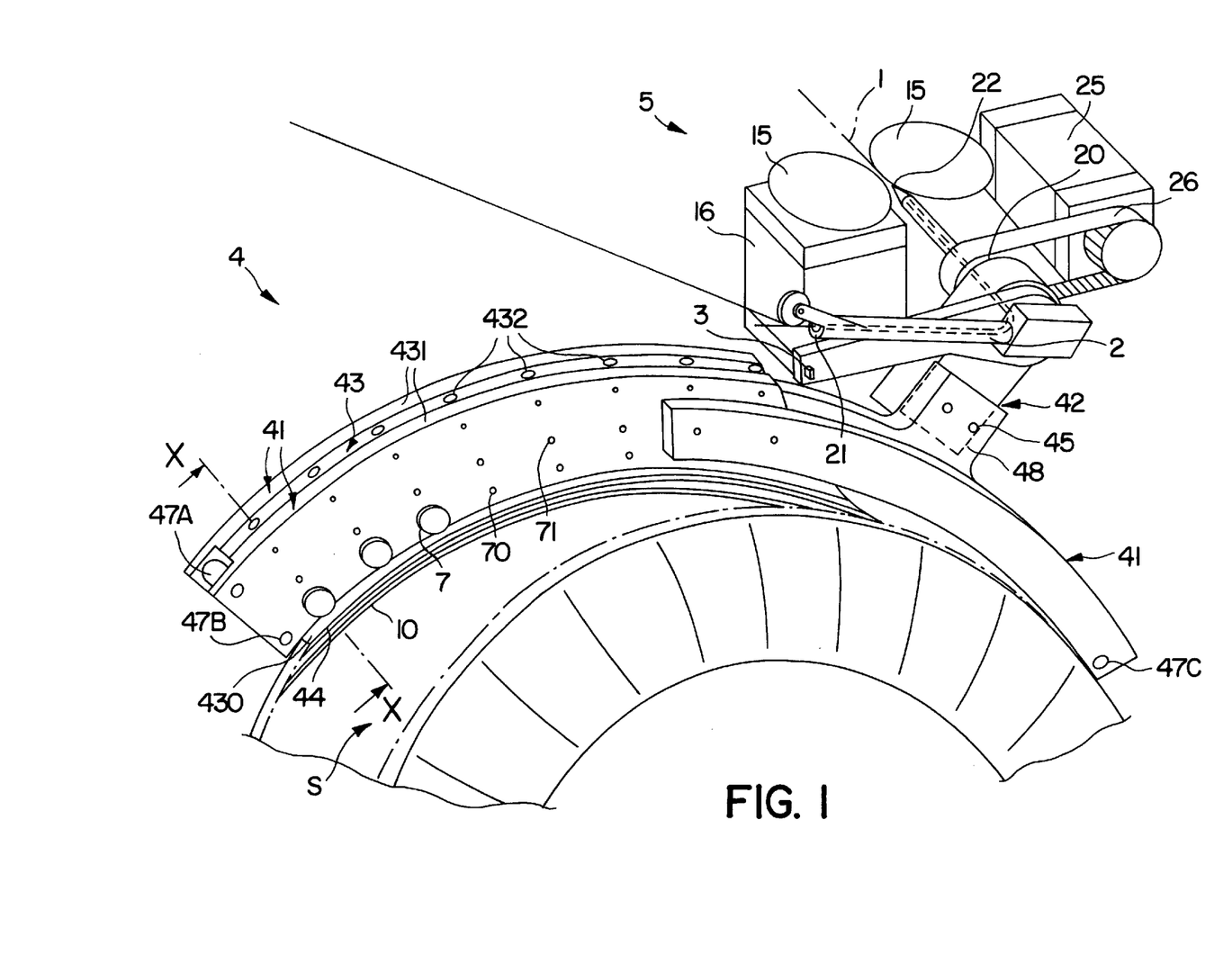
FIG. 1 is a perspective view showing the thread guide of the invention.

FIG. 1 illustrates an apparatus for the manufacture of a tire reinforcement employing this principle. Such an apparatus uses a thread 1 fed, for example, by feeding means from a spool, not shown. The apparatus projects lengths 10 of said thread onto a receiving surface S which in this case is part of the tire being manufactured.

The expression "thread" is used herein in a very broad sense to include a monofilament, a multifilament, a cable, a twist or an equivalent assembly, and this whatever the material constituting the thread or the treatment which it has undergone, for instance a surface treatment in order to favor its intimate bonding to rubber, or a rubberizing treatment surrounding said thread with a layer of rubber in order to permit its direct adherence on the support upon its projection.

The apparatus is an assembly 5 which includes:

means for advancing the thread 1 from a source of thread (not shown), such as a spool, a rotary conduit 2 mounted on a shaft 20 constituting the axis of rotation of said conduit, in such a manner that the outer radial end 21 of said conduit is directed substantially radially with respect to the axis of rotation, said conduit receiving the thread 1 at its central end 22 opposite said outer radial end 21 coming from the thread feeding means, said thread emerging through said outer radial end, said feeding means controlling the linear speed of advance of the thread within said rotary conduit, means for driving said rotary conduit 2 in rotation, means for cutting the thread in such a manner as to free one length upon each rotation of said rotary conduit 2.

Furthermore, said apparatus comprises a thread guide, designated generally as 4, for receiving lengths 10 of thread. For further details as to the operation of an apparatus of this type, reference should be made to U.S. Pat. No. 4,952,259. In that apparatus, the thread guide 4 is positioned with respect to said rotary conduit 2 in such a manner as to receive the thread, or more precisely lengths 10 removed one after another from this thread, in the plane of rotation of said conduit 2. The thread guide 4 receives each length 10 of thread, which passes through this thread guide and emerges through a projection orifice 40 in the immediate vicinity of the surface on which the length of thread is to be deposited and held by adherence. In a preferred embodiment of the apparatus, the lengths of cords are whipped and forced through the thread guide.

SUMMARY OF THE INVENTION

The object of the present invention is to simplify the production of such a thread guide and to facilitate the use of such a thread-laying apparatus for a wide range of manufactured articles, for example for a range of tires of many different types, involving different dimensions of crown reinforcements, curved to a greater or lesser extent on the surface onto which the lengths of thread are projected, and also different types of threads.

According to the invention, the thread guide comprises a pair of deflectors, defining at least one elongated inner passage, placed in said plane of rotation, the deflectors being arranged in such a manner as to leave between them a slot into which each length of thread can pass, said deflectors being arranged to exert a pressure towards each other during passage of a length of cord through the slot, and on the projection-orifice side, said deflectors being able to move apart for the passage of a length of thread. The thread guide provides means for regulating the position of said deflectors relative to each other in order to control the braking effect which they exert on threads to insure proper placement of the threads on the surface.

The thread guide of the invention is more particularly advantageous when certain metal reinforcement threads (wires) are deposited. In this case, it is desirable to brake the advance of the length of thread rather substantially before it reaches the surface of the tire blank in the course of manufacture. The amount of this braking depends on several parameters, such as the nature of the wire and the nature of the rubber coating covering the surface onto which the lengths of thread are projected. The existence of means for adjusting the pressure makes it possible to adjust the braking in the best possible manner and makes it possible to facilitate the use of this type of apparatus and improve the reliability thereof.

In the following, the invention is illustrated by a particular embodiment in which the thread guide forms a removable subassembly which comprises a cradle. In this example, the cradle forms an elongated, closed rectangle formed by two parallel branches connected to each other at their ends by braces and deflectors mounted within said branches. The cradle is provided with a fastening surface which permits the thread guide to be detachably mounted to the assembly. The fastening surface is preferably a simple, localized mounting for the thread guide, in this example, a mounting lug arranged on one of said branches on the side opposite one of said deflectors.

This embodiment, which of course is not limitative, makes it possible to preadjust the thread guide while it is not yet mounted on the reinforcement manufacturing machine. In tire manufacturing shops, one can have as many thread guides as necessary. When it is necessary to effect the production of several different ranges of tires, requiring in practice different adjustments of the thread guide, it is possible to select among several thread guides which have been pre-adjusted in the shop. One has all the time necessary in order properly to adjust the deflectors. This subassembly can then be mounted very rapidly on the machine at the desired moment, so as not to interfere with the productivity of the machines.

All details of the invention are explained below, with the aid of the accompanying drawings.

DESCRIPTION OF THE DRAWINGS

FIG. 7 is a section along VII of FIG. 6.

DESCRIPTION OF PREFERRED EMBODIMENTS

FIG. 1 shows the assembly 5, the function of which is to deliver lengths of thread provided with the movement which makes it possible for them to be placed on the surface on which it is desired to deposit them. The thread 1 is gripped between and advanced by feed rollers 15, one of which is driven in rotation by the motor 16. A motor 25 drives the shaft 20 through a belt 26. A stationary knife 3, arranged in the path of the thread 1 just downstream of the outer radial end 21, cuts the thread upon each revolution of the rotary conduit 2.

In the embodiment of the invention, the thread guide 4 forms a compact subassembly which rests on the frame of the thread-laying apparatus proper. It is mounted to it in a very firm but removable manner and is therefore easily detachable. As a result, it is very simple to change the thread guide when desired. One can make as many thread guides as necessary, for instance as many as there are different curvatures presented by the surface onto which the lengths 10 of thread are projected. It is therefore no longer necessary to provide a mechanism for adjusting the curvature. If it is necessary to use a different configuration for the thread guide, this is done very simply by changing the thread guide itself. Several pre-configured thread guides can be stored, so that this change can be carried out very rapidly.

It is important to note that, as compared with all the embodiments described in U.S. Pat. No. 4,952,259 mentioned above, the components of the assembly 5 are arranged in such a manner that all the mechanical parts of the assembly 5 are grouped on a single side of the rotary conduit 2. Stated differently, the drive of the rotation of said conduit and the drive of the thread 1 by the rollers are located on the same side. This is made possible by offsetting the motor 25 with respect to the shaft 20. This makes the mechanical structure very compact and facilitates the design of a single fastening surface 42 of small dimensions as compared with the space taken up by the thread guide 4.

Figure 2:
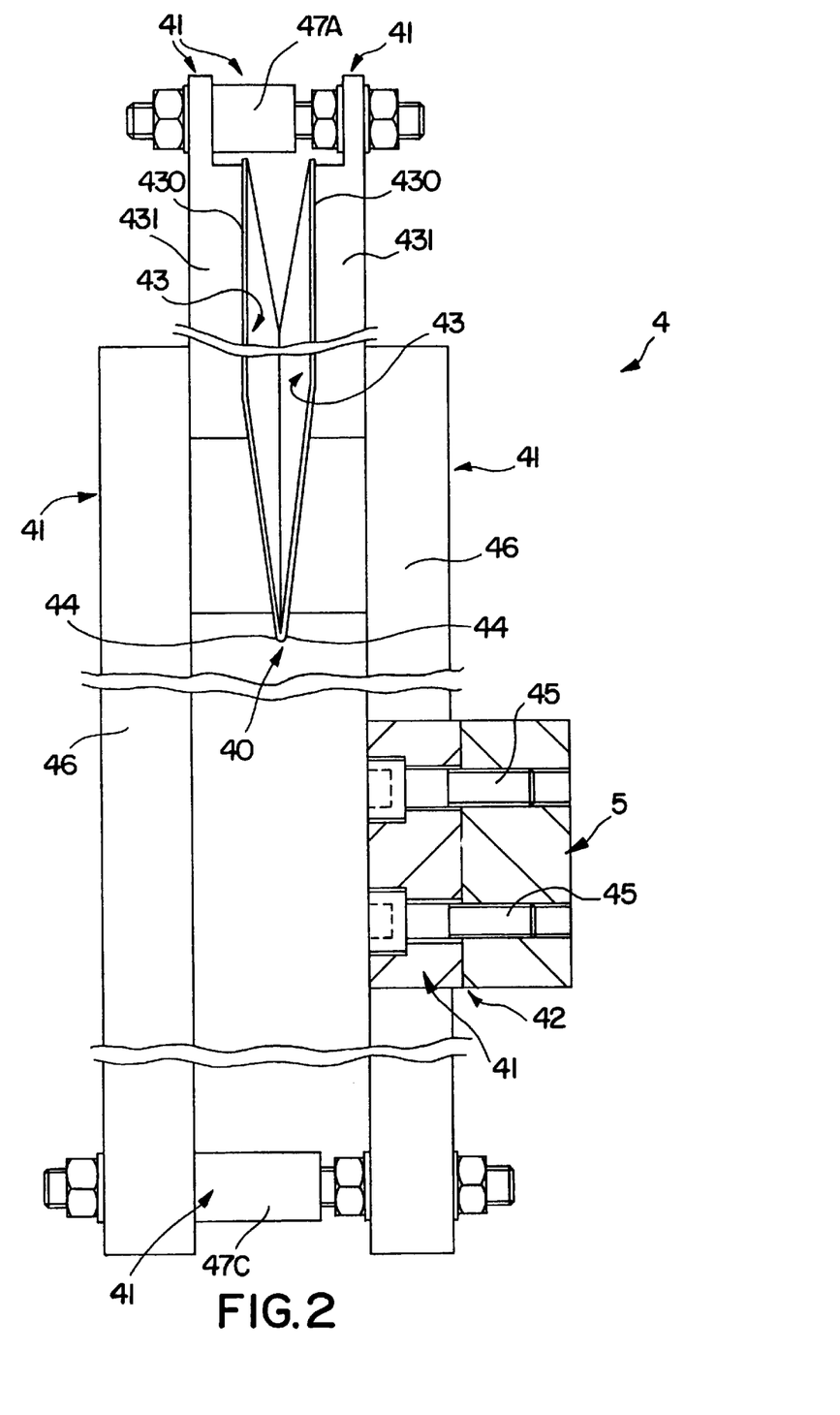
FIG. 2 is another view, showing part of the thread guide.

It is seen that the thread guide 4 is mounted overhung on the frame of the assembly 5 containing the rotary conduit 2. The fastening surface 42 is located at the interface between the thread guide 4 and the assembly 5 (see FIG. 2). Said surface is continuous and is entirely circumscribed by a closed line 48 (FIG. 1). It is designed to permit the removable fastening of the said thread guide 4 on said assembly 5. For this, one can use a quick-attachment system or even, very simply, screws 45. As the thread guide plays a guiding and braking role in order to assure high precision in the depositing of the lengths 10 of thread, it is important that the fastening surface 42 and the fastening means selected, in this case screws 45, permit a sufficiently firm mounting.

Figure 3:
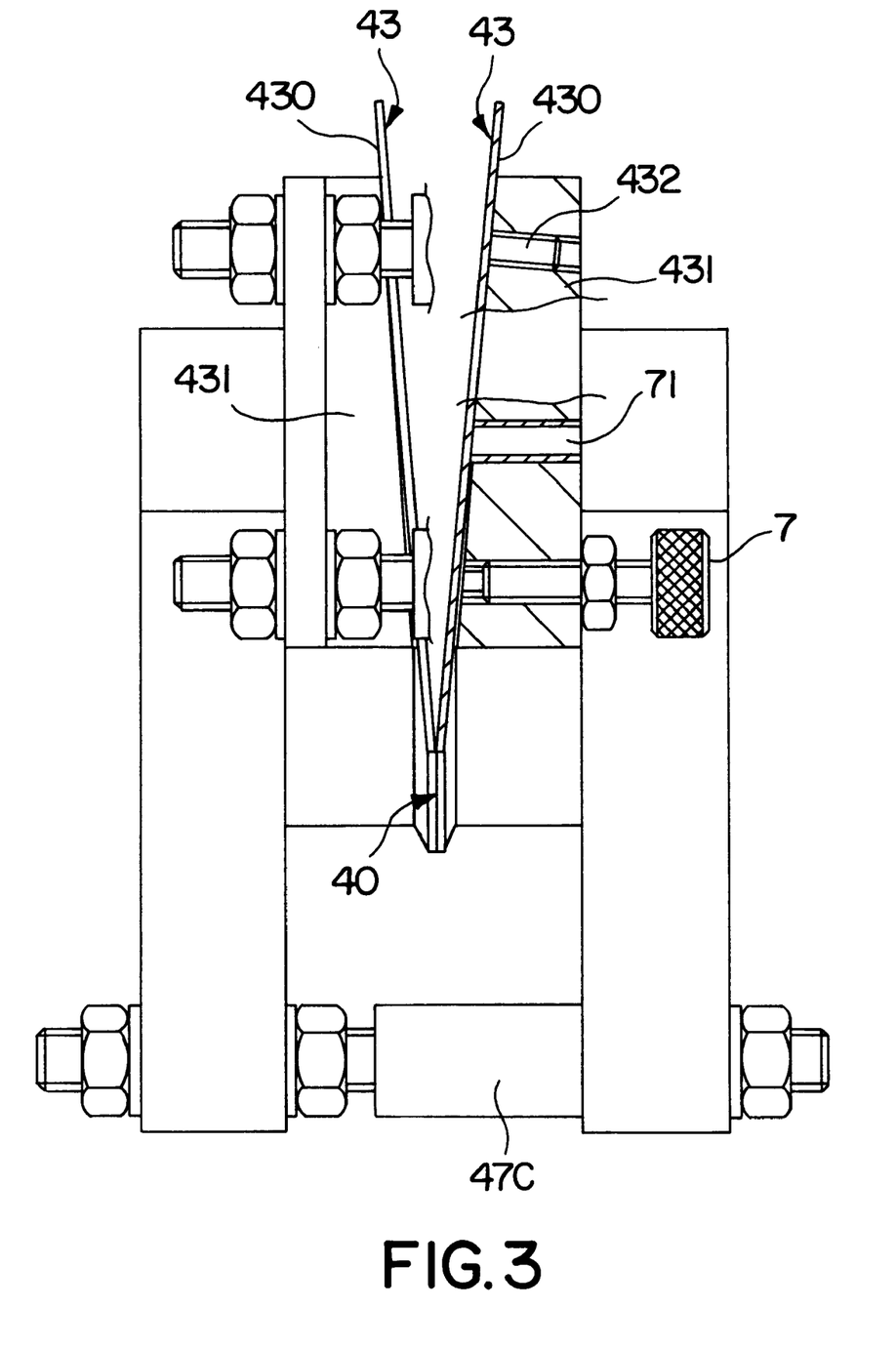
FIGS. 3, 4, 5 and 6 show, in greater detail, variant embodiments of an adjustment in accordance with the invention, in a half view and partial semi-section along the line XX of FIG. 1.

The thread guide 4 comprises a cradle, designated generally as 41, for the support of all the parts which constitute the thread guide. This cradle 41 includes a pair of deflectors 43 defining an elongated inner passage containing said plane of rotation. The deflectors are each formed by a metal sheet 430 fastened on a more solid support 431, in the part of said sheet remote from the projection orifice, by upper fastenings 432 (see FIGS. 1 and 3). These upper fastenings 432 are designed to support each sheet 430 from its respective support 431. The support 431 is either part of the cradle or attached to the inside of it. As can be seen from FIGS. 3 and 4, the metal sheet 430 protrudes radially towards the projection orifice 40 beyond the support 431. This makes it possible to assure a certain possible elastic deformation of the deflectors in the transverse direction, even if the metal sheets are applied against the support on the projection-orifice side.

Figure 4:
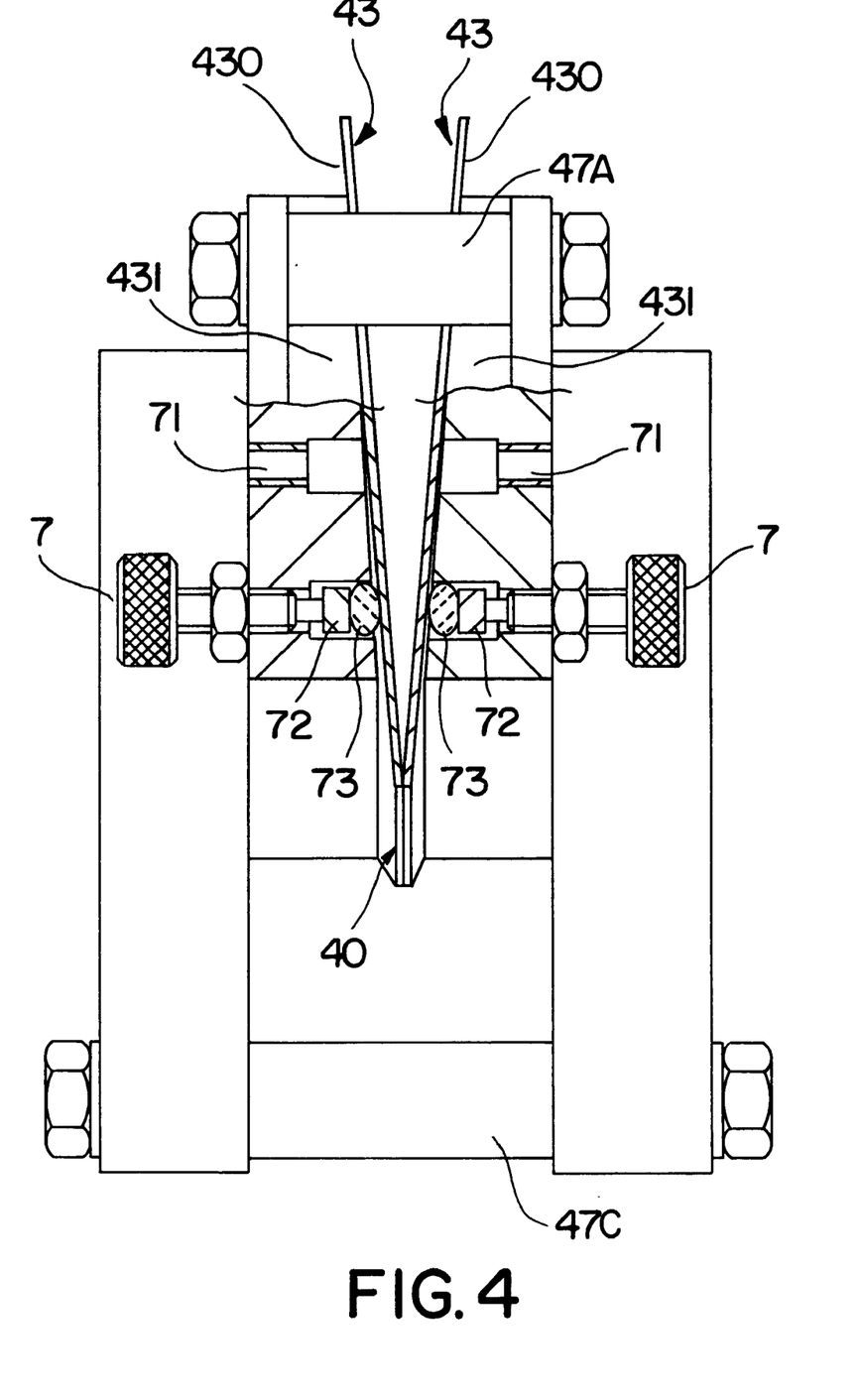

Pressure screws 7 are arranged between metal sheet 430 and support 431 to engage at least on one (FIG. 3) of said sheets in the region of the sheet closer to the projection orifice than the upper fastenings 432. Preferably, such pressure screws are installed to press against the two sheets and deflect them to control the width of the slot and the braking action which the sheets exert on the threads (FIG. 4). These screws 7 make it possible to move the sheet 430 away from its support 431. More specifically, the screws deflect the sheets 430 toward each other with or without (depending on thread to be placed on the surface S) causing the deflectors to make pressure contact with each other after adjustment and at rest. During operation of the thread guide, the sheets would always be spaced apart at the discharge of the threads from the thread guide onto the surface S. In one embodiment, the sheets are held apart from their respective supports until the two sheets 430 come into contact with each other at least at a point or at points in the slot for the passage of lengths of thread. The sheets are arranged in such a manner as to assure this contact at least on the side opposite the rotary conduit 2, that is to say in the region of the thread guide furthest from the assembly 5. It will be noted that the support 431 is provided with several threaded holes 70 which serve as anchoring points for the introductions of such pressure screws at the same level as those shown in the figures. There will also be noted the presence of other threaded holes 71 which can serve as possible anchoring points for the introduction of such pressure screws at an intermediate level between the pressure screws shown and the upper fastenings 432. It is possible to use only some of these threaded holes 70 or 71, selected specifically in accordance with the result of experimental tests carried out for each of the types of thread to be projected. It will be recalled that these pressure screws have been located in such a manner that, at the level of the lower edge 44, they permit the relative moving apart of said sheets in order to permit the lengths of thread to pass, while assuring an elastic return towards the initial position. The adjustment of these pressure screws 7 may be effected in the shop, off the machine, respecting pre-established directions as to prestressing.

FIG. 4 also shows another variant embodiment for the exerting of a certain pressure for the relative movement together of the sheets 430. The screws 7 act on the sheet 430 via a ring-shaped arc 72 (and possibly several contiguous arcs) and a cushion 73 of rubber or any other flexible material.

In the embodiment of the invention shown, the cradle 41 is formed by two curved bars 46, by each of the solid supports 431, and by three braces 47A, 47B and 47C. Seen in the plane of projection of the lengths, the cradle 41 has substantially the shape of a curved, closed, elongated rectangle formed by two substantially parallel branches connected together at their ends. The closed structure of the cradle 41 imparts to it strength, rigidity and lightweight, features which, in addition to the use of a fastening surface 42 of fixed location, insure that the cradle is easy to remove and replace. Note that the cradle can become closed through the fastening means at the time it is attached to the assembly 5, and this variation is within the meaning of the term "closed" as used herein. The deflectors are mounted within said branches, and the fastening surface is arranged on one of said branches on the side opposite one of said deflectors. The deflectors are shaped in such a manner that the distance between each deflector decreases as the projection orifice is approached (see FIG. 2).

The rectangle which the cradle 41 forms leaves a sufficiently long passage so that the lengths 10 can pass through. The brace 47C does not interfere with the passing of the length 10 which has just been freed by the knife 3, nor with the passing of the end of the thread which emerges from the outer radial end 21 of the rotary conduit 2. The feed of the thread imparts to it a continuous advance, and just after the cutting by the knife 3, the end of the thread (the length is not designated here) forms a spiral path in the plane of rotation of the conduit 2. The brace 47C must therefore be located radially beyond this path in order not to interfere with the movement of the thread.

Furthermore, in order to provide another means of adjusting the pressure of the deflectors towards each other, at least one of said braces (preferably the brace 47B) is of variable length in order to adjust the distance between said deflectors. Preferably all the braces 47A, 47B, and 47C are adjustable: they have a threaded rod which is fastened immovably on one of the supports 431 and maintain the other support 431 by means of nuts and lock nuts. This type of adjustment can be used simultaneously with the adjustment described above, or each of the adjustments can be used alone. If one designs a thread guide for a single specific thread, one can also use spacing inserts to hold in an unadjustable manner the sheets at a given distance remote from the support.

The deflectors are arranged in such a manner as to leave between them a slit through which each length of thread can pass forcibly. Each deflector comprises, on the projection-orifice side, an edge 44 which is curved in such a manner as to approach the shape of the receiving surface S onto which the lengths 10 of thread are projected. This edge 44 corresponds to the lower edge of the corresponding metal sheet 430. In this example, the edge closely follows the curve of the crown of a tire, as viewed in planar radial section, and forming a typical angle of the crown reinforcement threads. More generally, the trace which the perpendicular projection of each of said edges forms in the plane of rotation of the rotary conduit 2 is non-linear in order to follow more or less closely the curves of the receiving surface.

The dimensions of the fastening surface 42 are substantially smaller than the length of the deflectors measured along said edge 44, that is to say along the slit through which the lengths 10 pass.

The clearance between the edges 44 and the receiving surface S is substantially constant (see FIG. 1). It corresponds, for instance, to two or three times the thickness of a length 10 of thread. Due to the fact that the metal sheet 430 makes it possible to assure a continuous guiding of the length 10 along its entire length, a precise depositing of the length at the desired place is obtained. In practice, it is only the metal sheets 430 which must be cut to the approximate profile of the surface S. Furthermore the rubbing of the lengths 10 on these sheets causes in the long run a certain amount of wear of the sheets. For all of these reasons, it is very practical to be able to replace them. However, in order not to reduce the productivity of the machines, the invention makes it possible to replace the metal sheets on a thread guide which is not mounted on the assembly 5. One thus works on a subassembly (thread guide 4) in the shop, having all the time necessary in order properly to mount and adjust these sheets 430 correctly, whereupon this subassembly can be mounted on the machine at the desired time.

The cradle 41 thus constitutes a mechanical support on which all of the parts of the thread guide are combined. Furthermore, it is known that the rotary conduit and the driving members for the thread form an assembly 5 which must approach the surface on which it is desired to manufacture a crown reinforcement and correctly position it in order for the threads to be projected precisely at the desired place. The same is true with respect to the thread guide. Since the cradle 41 is integral with said assembly 5, it will be understood that the thread guide 4 precisely follows the movements which a mechanism (not shown) may confer upon the assembly 5 in order to enable it to approach the support on which a tire is manufactured.

Figure 5:
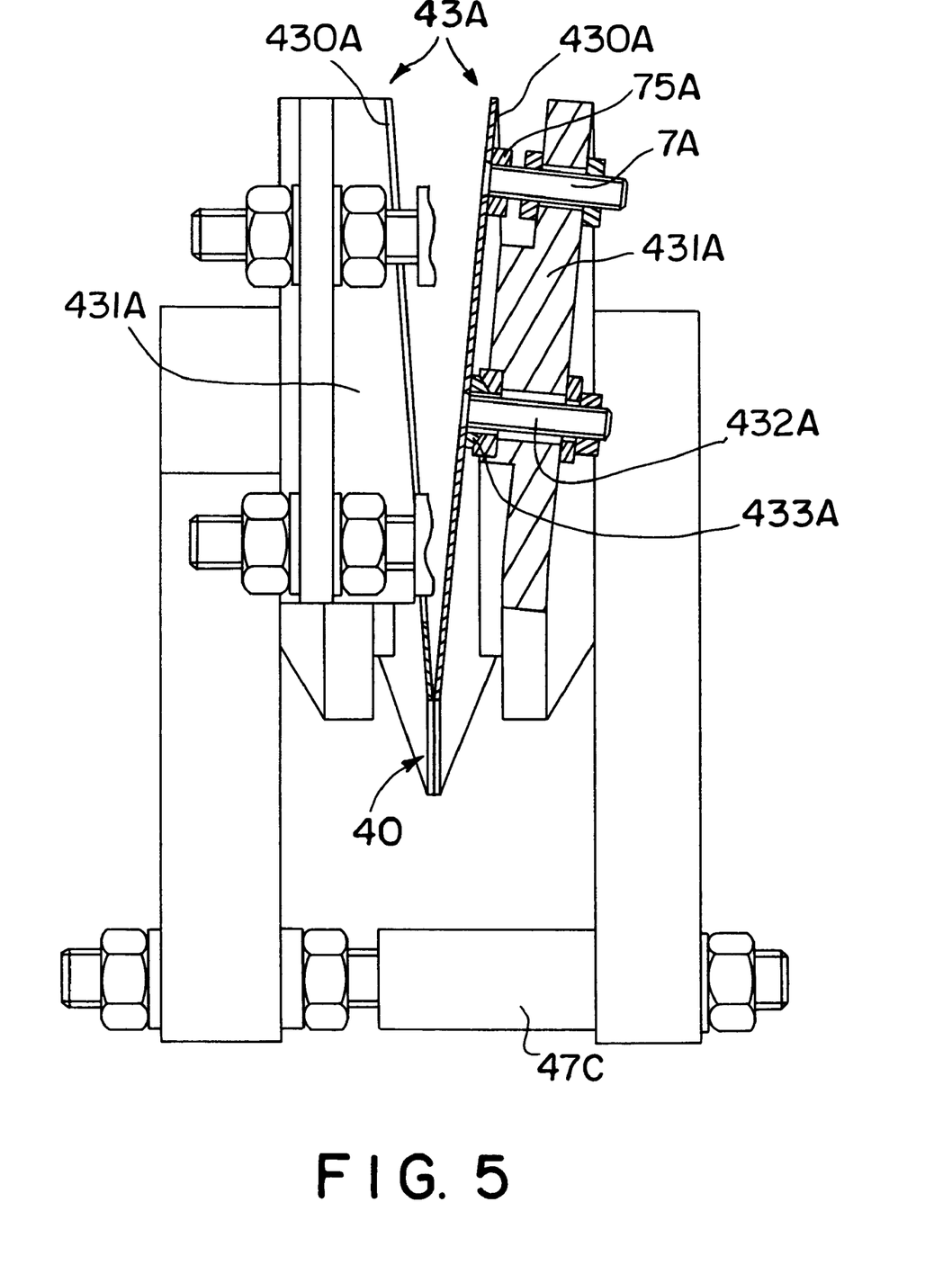

In a third embodiment, shown in FIG. 5, the deflectors 43A are also each formed by a metal sheet 430A, fastened on a rigid support 431A. Each metal sheet 430A is attached at a part of said sheet remote (but less remote than in the first and second embodiments) from the projection orifice 40, by fastening screws 432A pressing the metal sheet 430A against the support 431A via a partial ball joint 433A accommodated for pivotal movement in a socket, thereby providing a pivotal coupling between the deflector and the support. These fastening screws 432A are designed to hold the sheet 430A on its support 431A.

Deflector adjusting screws 7A are provided to set the metal sheet 430A in a predetermined and adjusted position with respect to the support 431A at the upper part of the metal sheet 430A. The screws act in an upper region opposite the orifice 40 and above the intermediate region where the metal sheet 430A is attached to its support 431A through the pivotal coupling. Once the selected position of metal sheet 430A with respect to the support 431A is adjusted, the metal sheet 430A is firmly locked to the screw 7A by tightening a nut 75A against the deflector. These screws 7A make it possible to move the sheet 430A closer to its support 431A, e.g., until the two sheets 430A come into contact with each other at least at a point or at points in the slot for passage of lengths of thread. It is understood that, the closer the metal sheet is to the support in the region of the screws 7A, the higher the pressure on the thread when passing through the orifice 40 due to the pivotal coupling 433A which moves the lower edge of the deflector sheet toward the lower edge of the other deflector sheet.

Figure 6:
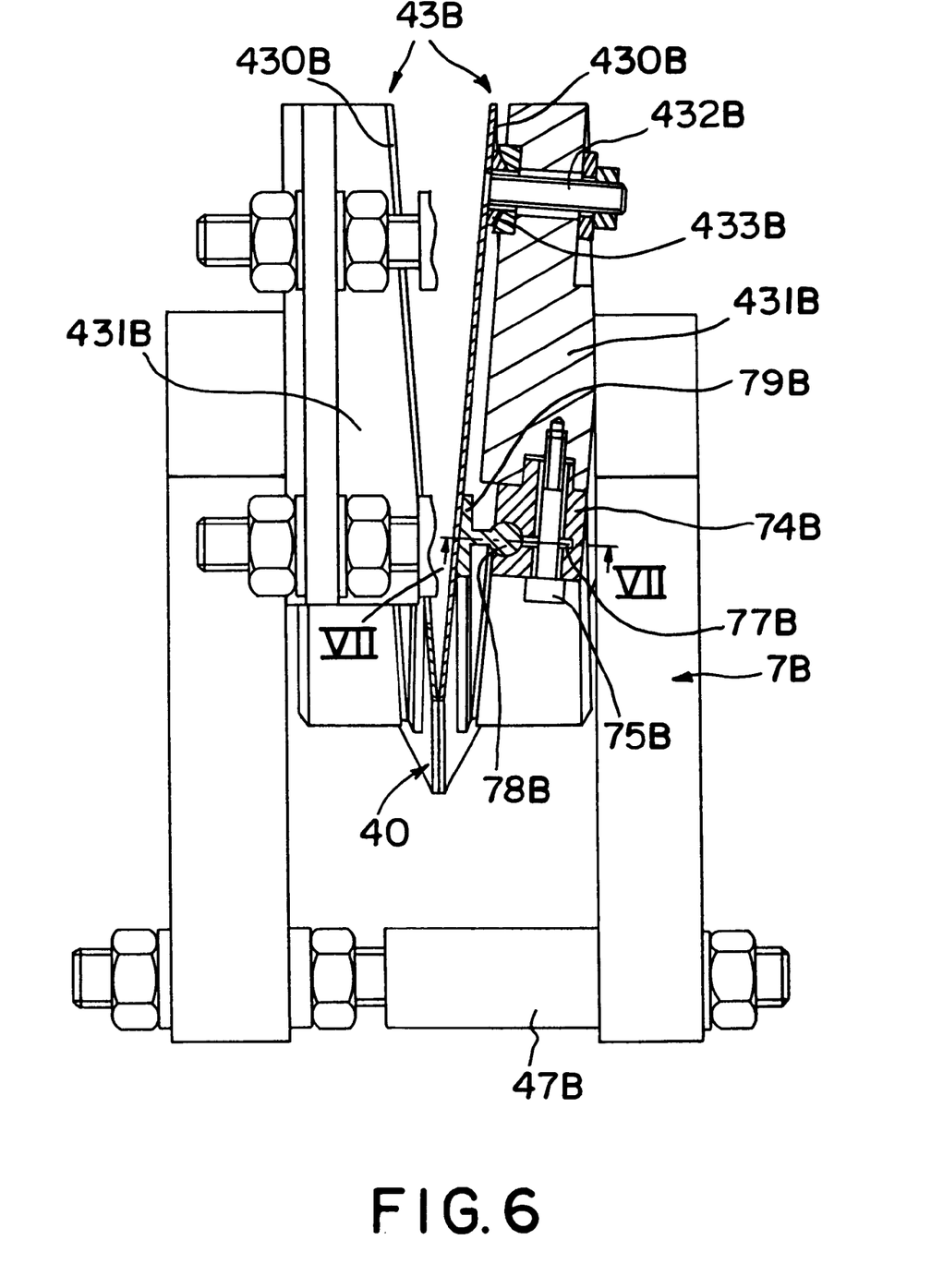

In a fourth embodiment, shown in FIGS. 6 and 7, the deflectors 43B are also each formed by a metal sheet 430B mounted on a rigid support 431B. Each metal sheet 430B is attached at a part of said sheet remote from the projection orifice 40 by fastening screws 432B pressing the metal sheet 430B against the support 431B via a partial ball joint 433B accommodated for pivotal movement within a socket. The fastening screw 432B is designed to hold the sheet 430B on its support 431B at the upper part of the metal sheet 430B.

A deflector adjusting device 7B is arranged to set to a predetermined and adjusted position the metal sheet 430B with respect to the support 431B in a region between the orifice 40 and the part of the metal sheet attached to the support through the pivotal coupling 433B. In a variation, the metal sheet 430B could be attached to the support 431B in the middle part of the sheet, and the deflector adjusting device 7B could be arranged at the upper part, as are the screws 7A of the embodiment of FIG. 5.

The pressure adjusting device 7B has a first part 74B adjustably attached to the support 431B by screws 75B. As shown in FIG. 7, the screws are inserted in elongated holes 740B to allow a sliding adjustment of the first part 74B on the support 431B. The first part 74B has an elongated guide recess 741B in which a rib 78B carried on the outer surface of the deflector 430B is accommodated. The rib 78B, the recess 741B and the elongated holes 740B extend diagonally to the deflector sheet, so that adjustment of the part 74B relative to the support to the extent permitted by the elongated holes 740B displace the lower end of deflector 430B relative to the support and the opposite deflector, the upper end of the deflector being pivotally adjusted on the pivotal coupling 433B. Once the selected position of the deflector sheet 430B with respect to the support 431A is adjusted, the sheet 430B is firmly locked in place by tightening the screws 75B.

The embodiments, shown in FIGS. 5 to 7, provide a means for adjusting one of the deflectors 430A, 430B relative to the support and the opposite deflector on a pivotal coupling mounting the adjustable deflector to the support without bending the deflector or with minimum bending of the deflector by displacement of the deflector relative to the support at a location offset radially above or below the pivotal coupling and then locking the deflector in the desired adjusted position. The type of adjustment provided by the braces 47A, 47B and 47C, as described above, can be used simultaneously with the adjustment described for the third and fourth embodiments.

I claim:

1. An apparatus for manufacturing a reinforcement from a thread deposited directly at its final place by projecting lengths of said thread onto a receiving surface, said apparatus including an assembly comprising:

means for advancing the thread, a rotary conduit having an axis of rotation so that the outer radial end of said conduit is oriented substantially radially with respect to the axis of rotation, said conduit receiving the thread from the advancing means at its central, inner end opposite said outer radial end, said thread emerging through said outer radial end, said advancing means controlling the linear speed of advance of the thread within said rotary conduit, means for driving said rotary conduit in rotation, means for cutting the thread to free a length upon each rotation of said rotary conduit, said apparatus furthermore comprising a thread guide for receiving lengths of thread, the thread guide being positioned with respect to said rotary conduit in such a manner as to receive the thread in the plane of rotation of said conduit, said thread guide having a projection orifice from which the thread can emerge, in which the thread guide comprises a support, a pair of deflectors mounted on the support for guiding and controlling the braking pressure exerted on the passage of the lengths of threads before discharge from the projection orifice and means for adjusting the braking pressure by the adjustment of at least one deflector relative to the other deflector, said adjusting means including a pivotal coupling connecting the adjustable deflector and the support and means for pivotally adjusting the deflector on said pivotal coupling.

2. An apparatus as set forth in claim 1 in which the means for pivotally adjusting the deflector on said pivotal coupling includes means offset from the pivotal coupling for adjusting the spacing between the support and the deflector and locking the deflector in adjusted position.

3. An apparatus as set forth in claim 2 in which the offset means includes an adjustable screw for adjusting the deflector relative to the support and means for locking the screw in adjusted position.

4. An apparatus as set forth in claim 2 in which the offset means includes an adjustable slide having a diagonal connection between the support and the deflector for adjusting the deflector relative to the support.

5. An apparatus as set forth in claim 1 in which the pivotal coupling includes a ball joint and a socket for accommodating the ball joint.

6. An apparatus as set forth in claim 1 in which the lower edges of the deflectors define the projection orifice and in which the lower edges are curved convexly to conform generally to the shape of the receiving surface.

7. An apparatus according to claim 1 in which the distance between the deflectors decreases upon approaching the projection orifice.

8. An apparatus according to claim 1 in which the deflectors are in contact with each other at least at a point or points in the slot for the passage of lengths of thread to the projection orifice.

9. An apparatus as set forth in claim 2 in which the offset means act in a region opposite the orifice with respect to the region of the pivotal coupling.

* * * * *